United States Patent [19]
Wortmann et al.

[11] 3,974,260
[45] Aug. 10, 1976

[54] DESENSITIZED FREE-FLOWING RED PHOSPHORUS

[75] Inventors: Joachim Wortmann, Hurth; Franz-Josef Dany, Erftstadt Lechenich; Hedwig Prell, Knapsack; Joachim Kandler, Erftstadt Lechenich, all of Germany

[73] Assignee: Hoechst Aktiengesellschaft, Frankfurt am Main, Germany

[22] Filed: Oct. 4, 1973

[21] Appl. No.: 403,462

[30] Foreign Application Priority Data
Oct. 11, 1972 Germany.......................... 2249638

[52] U.S. Cl.............................. 423/265; 423/322
[51] Int. Cl.$^2$...................................... C01B 25/023
[58] Field of Search............... 423/322, 265, 264; 252/383, 384; 106/15 FP; 117/137

[56] References Cited
UNITED STATES PATENTS

| | | | |
|---|---|---|---|
| 1,433,100 | 10/1922 | Sadtler.............................. | 423/322 |
| 1,692,996 | 11/1928 | Richardson et al................ | 252/384 |
| 1,853,818 | 4/1932 | Kobbe.............................. | 423/265 |
| 2,005,944 | 6/1935 | Malisheu.......................... | 252/384 |
| 2,440,303 | 4/1948 | Silverstein........................ | 423/322 |
| 2,926,096 | 2/1960 | Sakornbut........................ | 106/15 FP |
| 3,179,589 | 4/1965 | Lobos.............................. | 252/383 |
| 3,194,846 | 7/1965 | Blaga.............................. | 106/15 FP |
| 3,220,858 | 11/1965 | Behr............................... | 106/15 FP |
| 3,629,309 | 12/1971 | Bailey et al...................... | 106/15 R |
| 3,663,174 | 5/1972 | Dany et al........................ | 423/322 |
| 3,808,127 | 4/1974 | Sander et al..................... | 423/322 |
| 3,826,762 | 7/1974 | Treadwell........................ | 106/15 FP |

FOREIGN PATENTS OR APPLICATIONS
1,141,213   6/1969   United Kingdom................ 423/322

OTHER PUBLICATIONS
Morrison & Boyd, *Organic Chemistry*—1966, p. 108.

*Primary Examiner*—Oscar R. Vertiz
*Assistant Examiner*—Eugene T. Wheelock
*Attorney, Agent, or Firm*—Connolly and Hutz

[57]   ABSTRACT

Desensitized free-flowing red phosphorus. The phosphorus is comprised of a homogeneous blend consisting of between about 80 and 98 weight% of red phosphorus having a particle size of up to about 2 mm, and of between about 2 and 20 weight% of an organic or organo-silicon compound desensitizer. The desensitizer is liquid, inactive with respect to red phosphorus and has a minor vapor pressure at room temperature at atmospheric pressure.

3 Claims, No Drawings

DESENSITIZED FREE-FLOWING RED PHOSPHORUS

The present invention relates to desensitized free-flowing red phosphorus and to a process for making it, wherein pulverulent red phosphorus is treated with a desensitizer.

It is known that red phosphorus finds use for pyrotechnical purposes, for making matches, and more recently for the flame-proofing of plastics, such as polyvinylchloride or polyurethanes. Its use in all of these fields is, however, handicapped by the high flammability inherent to pulverulent red phosphorus. More particularly, it has not been possible heretofore in the treatment of red phosphorus to avoid the formation of dust which is very hazardous as even electrostatic disruptive sparks may initiate dust explosions which spread out at high velocity. This risk is the greater the greater the fineness of ground red phosphorus. On the other hand, however, it is necessary for finely pulverized red phosphorus to be used for the flame-proofing of plastics. It is therefore an object of the present invention to provide desensitized red phosphorus which is not hazardous to use.

As taught in German Pat. No. 1 185 591, it is possible for pulverulent red phosphorus to be guarded against the action of air and moisture by intimately blending it with finely divided paraffin and/or wax, heating the blend to a temperature slightly higher than the melting point of the paraffin and/or wax, and thereafter cooling the blend.

A further process for impregnating ground red phosphorus has been described in German Pat. No. 1 567 629, wherein particulate phosphorus in aqueous suspension is treated with precipitated magnesium hydroxide or aluminum hydroxide, and the phosphorus so stabilized is filtered off and dried.

Red phosphorus so treated is in fact well-stabilized against oxidation, but it still tends to form dust and is accordingly readily ignitable.

A still further process for making passivated red phosphorus has been described in German Pat. No. 2 000 033, wherein between 10 and 85 weight% of pulverulent red phosphorus having a size of up to about 100 microns is blended with between about 90 and 15 weight% of molten ε-caprolactam, under inert gas. The resulting phosphorus-containing melt is allowed to solidify in a cooler and the solidified product is removed therefrom in the form of lumpy or scaly material. An adverse effect resides in the fact that it is necessary for this process to be effected under inert gas and in the fact that the resulting passivated red phosphorus is obtained in the form of lumpy rather than pulverulent or granular material.

The present invention now provides desensitized free-flowing red phosphorus comprising a homogenous blend consisting of between about 80 and 98 weight% of red phosphorus having a particle size of up to about 2 mm, and of between about 2 and 20 weight% of an organic or organo-silicon compound desensitizer, the desensitizer being liquid, being substantially inactive with respect to red phosphorus, and having a minor vapor pressure at room temperature at atmospheric pressure.

The blend of the present invention should more preferably contain between 4 and 10 weight% of desensitizer and the desensitized red phosphorus should have a particle size between about 0.0001 and 0.1 mm.

The desensitizers which have been found useful in accordance with this invention, include more particularly, for example: paraffin oils, preferably those which have a density between about 0.83 and 0.88 g/cc and a viscosity between about 15 and 380 centipoises; chlorinated paraffin oils, preferably those which contain between about 30 and 70 weight% of chlorine and have a viscosity between about 100 and 15000 centipoises; dioctylphthalate; tris-(β-chlorethyl)-phosphate; tricresyl phosphate; mineral oils with a boiling range between about 170° and 350°C; the silicon-polyether block copolymer U 119 of Wacker Chemie GmbH, Munich; or the silicon oil SF 1066 of General Electric Co.

The invention also provides a process for making desensitized free-flowing red phosphorus, which comprises intimately blending between about 80 and 98 weight% of pulverulent red phosphorus having a particle size of up to about 2 mm with between about 2 and 20 weight% of an organic or organo-silicon compound desensitizer, the desensitizer being liquid, being substantially inactive with respect to red phosphorus, and having a minor vapor pressure at room temperature at atmospheric pressure, so as to obtain a non-dusting blend.

In accordance with a preferred feature of the process of the present invention, the blend should be made with the use of between 4 and 10 weight% of desensitizer and the red phosphorus should be used in the form of particles having a size between about 0.0001 and 0.1 mm.

The desensitizers useful in the process of the present invention include more particularly, for example: paraffin oils, preferably those which have a density between about 0.83 and 0.88 g/cc and a viscosity between about 15 and 380 centipoises; chlorinated paraffin oils, preferably those which contain between about 30 and 70 weight% of chlorine and have a viscosity between about 100 and 15000 centipoises; dioctylphthalate; tris-(β-chlorethyl)-phosphate; tricresyl phosphate; mineral oils boiling between about 170° and 350°C; the silicon-polyether block copolymer U 119 of Wacker-Chemie GmbH, Munich; or the silicon oil SF 1066 of General Electric Co.

A further preferred feature of the process of the present invention comprises blending red phosphorus with a solution of the organic or organo-silicon compound in an inert solvent having a boiling point of at most about 60°C, and thereafter evaporating the solvent. Trichlorofluoromethane, trifluorotrichloroethane or methylene dichloride, for example, are useful solvents. Use should conveniently be made of an eccentric tumbling mixer for blending red phosphorus with the liquid organic compound or a solution thereof.

The following statements further illustrate the present invention.

It is not possible for any mixer to be used for making the blend of red phosphorus and organic liquid. Use should conveniently not be made of a blade agitator as this does not reliably avoid the initial formation of dust so that it would be necessary for the blend to be made in hermetically sealed containers under inert gas. As has unexpectedly been found, it is possible for the organic liquid to be homogeneously distributed in red phosphorus by placing the two blend components in a container and preparing the blend therein with the use of an eccentric tumbling mixer. The container should preferably be filled about half-way its volume with red phosphorus and the organic liquid should be poured thereonto. The container is then closed and set to tumbling motion. Use can be made of an ordinary barrel having a cover, or of a barrel having a polyethylene bag placed therein. Merely minor frictional heat has been found to be set free by so blending the components, so that ignition of the resulting blend is not likely to occur. In those cases in which the polyethylene bag, which is placed in the barrel, is merely filled half-way its volume, it is possible, after preparation of the blend, to place a second bag in the barrel and fill it the same way. In other words, it is possible for the barrel to be completely filled without the need to transfer phosphorus from a container thereinto.

As mentioned hereinabove, the desensitizer can be used in admixture with a diluent or solvent. In this case, it is necessary for the solvent to be used in a proportion sufficient to ensure complete impregnation of the red phosphorus with the solution, and to ensure the formation of a liquids layer thereabove. In this latter case, where it is not obligatory for the components to be blended mechanically, it is merely necessary, once the red phosphorus is found to have been completely wetted, to evaporate the solvent.

The 100made by the 0.15 of the present invention has good flow and non-dusting properties. In addition to this, red phosphorus so modified has a considerably reduced flammability so that it can readily be used in the fields described hereinabove. By wetting the phosphorus particles with the desensitizer they are rendered water-repellent and thereby guarded against oxidation in contact with air, which is normally promoted in the presence of water. The desensitizing effect produced in accordance with this invention can be detected by visual inspection of stabilized pulverulent red phosphorus, which was shaken but could not be found to dust, or by ignition tests. This is demonstrated in the following Examples.

EXAMPLE 1:

Six 20 kg specimens of pulverulent red phosphorus were placed in six tin drums having a capacity of 40 kg and each of the individual specimens was blended with one of the desensitizers A, B, C, D, E and F identified hereinafter. The phosphorus had the following particle size distribution:

100% smaller than mm
99% smaller than 0.075 mm and
65% smaller than 0.44 mm.

The individual desensitizers were used at a rate of 2 kg. The A, B, C, D, E and F desensitizers comprised the following products:

A. Paraffin oil, which had a density of 0.88 g/cc and a viscosity of 380 centipoises at 18°C.

B. Chlorinated paraffin oil, which contained 30 weight% of chlorine and had a viscosity of 120 centipoises at 18°C.

C. Dioctylphthalate.

D. Tis-($\beta$-chlorethyl)-phosphate.

E. Mineral oil boiling between 170° and 220°C.

F. Silicon-polyether block copolymer (type U 119 of WackerChemie GmbH, Munich) which had a viscosity at 25°C of 1000 – 1500 centistoke, a density at 25°C of 1,04 and a refractive index at 25°C of 1,445 – 1,448.

The tin drums with the blends therein were closed by means of a locking ring cover, fixed in a customary eccentric tumbling mixer and set to tumbling motion. After about 20 min., the drums were emptied and the desensitizing effect produced was determined on the six specimens. The effect produced was rated along the ignitibility of the specimens by means of ignition sparks. The ignition sparks were produced with the use of a spark plug for automobiles, which had slightly extended electrodes spaced about 1 mm apart, and which was connected to a 12 volt battery through an ignition coil and a break switch.

Ignition tests were made on the phosphorus specimens blended with desensitizers A – F. In one case, the electrodes were directly held into a loose bed of pulverulent phosphorus, and in a second case red phosphorus was placed in a tin can through the cover of which the spark plug was extended so as to open into the interior of the can. The electrodes of the spark plug terminated about 1 cm above the surface of the phosphorus. The can which had the phosphorus therein was vigorously shaken and ignition sparks were produced in an attempt to ignite dispersed phosphorus, if any.

The ignition test results are indicated in the Table hereinafter, wherein specimens 1 to 6 are phosphorus specimens blended with desensitizers A – F, respectively. Specimen 7 is an untreated red phosphorus specimen and specimens 8 and 8 are phosphorus specimens stabilized with 15 weight % of paraffin (cf. German Pat. No. 1 185 591) or with 1.8 weight % of paraffin (cf. German Pat. No. 1 567 629). As will more fully appear from the Table, merely specimens 1 to 6 (invention) failed to be ignitible. Comparative specimens, 7 to 9 were found to burn off, after a few ignitions.

EXAMPLE 2

The procedure was the same as that described in Example 1 save that five phosphorus specimens were blended with the following desensitizers G, H, J, K and L. Desensitizers G and K were used at a rate of 0.5 kg. and 1 kg, respectively, and desensitizers H, J and L were used at a rate of 4 kg.

The desensitizers comprised the following products:

G. Paraffin oil, which had a density of 0.83 g/cc and a viscosity of 15 centipoises.

H. Chlorinated paraffin oil, which contained 70 weight % of chlorine and had a viscosity of 1200 centipoises.

J. Mineral oil boiling between 280° and 350°C.

K. Tricresyl phosphate.

L. Copolymer of dimethylpolysiloxane and polyoxyalkylene ether (type SF 1066 $^R$; a product of General Electric Co, USA), which had a density of 1.08 g/cc and a viscosity of 1600 centipoises.

The five phosphorus specimens were subjected to the ignition tests described in Example 1. More particularly, tests were made in an attempt to ignite a loose bed of powder by direct contact with ignition sparks, and to ignite dispersed powder. None of the specimens could be found to have been burnt off after altogether 40 ignition tests.

EXAMPLE 3 a. A round flask provided with a descending cooler was fed with 1.5 kg. of pulverulent red phosphorus, which was the same as that used in Example 1, and a solution of 75 g of paraffin oil (desensitizer M) and 2 kg of trichlorofluoromethane was poured thereonto. The paraffin oil had a density of 0.85 g/cc and a viscosity of 110 centipoises. The solution was allowed to remain in contact with the red phosphorus over a period of 5 min. After that time, the trichlorofluoromethane was distilled off and the residue was heated for a further 5 min. to 50°C. once the distillation was complete.

b. The experiment described under (a) was repeated but a solution of 150 g of chloroparaffin (desensitizer N) and 1.5 kg. of trifluorotrichloroethane was used. The chloroparaffin contained 40 weight% of chlorine and had a viscosity of 100 centipoises.

c. The experiment described under (a) was repeated but a solution of 100 g of mineral oil (desensitizer O) and 1.5 kg of methylene dichloride was used. The mineral oil boiled at temperatures between 260° and 320°C and had a viscosity of 300 centipoises.

The phosphorus specimens prepared as described under (3a) – (3c) were tested as to their ignitibility in the manner described in Example 1. None of them could be found to have been burnt off after altogether 40 ignition tests.

EXAMPLE 4

20 kg red phosphorus which had the following particle size distribution:

| mm | 1–2 | 0.1–1 | 0.04–0.1 | <0.04 |
| --- | --- | --- | --- | --- |
| % | 8 | 64 | 26 | 2 | were blended with 2 kg of desensitizer M, in a manner analogous to that described in Example 1. The blend so made, which was found to be non-ignitible in the ignition tests of Example 1, after altogether 40 ignitions, had good flow properties and was free from dust-producing constituents.

Table

| Specimen No. | Number of ignition tests on loose bed of powder | Number of ignition tests on dispersed powder | Burning of specimen |
| --- | --- | --- | --- |
| 1 | 40 | 40 | − |
| 2 | 40 | 40 | − |
| 3 | 40 | 40 | − |
| 4 | 40 | 40 | − |
| 5 | 40 | 40 | − |
| 6 | 40 | 40 | − |
| 7 | 3 | 5 | + |
| 8 | 9 | 6 | + |
| 9 | 5 | 7 | + |

(−) = non-burning
(+) = burning

We claim:
1. Desensitized non-dusting free-flowing red phosphorus comprising a homogeneous blend consisting of between about 80 and 98 weight % of red phosphorus having a particle size of up to about 2 mm, and of between about 2 and 20 weight % of a desensitizer compound selected from the group consisting of a chlorinated paraffin oil containing between about 30 and 70 weight % of chlorine and having a viscosity of between about 100 and 15,000 centipoises at 18°C., tris-($\beta$-chloroethyl)-phosphate, tricresylphosphate, a silicon-polyether block copolymer having a viscosity at 25°C. of 1,000 – 1,500 centistoke, a density at 25°C. of 1.04 and a refractive index at 25°C. of 1.445 – 1,448 and a copolymer of dimethylpolysiloxane and polyoxyalkylene ether having a viscosity at 25°C of 1,200 to 1,500 cS, a specific gravity at 20°C. of 1.04 and a hydroxyl number of 4–6 mg KOH/g.

2. Red phosphorus as claimed in claim 1, the blend containing between 4 and 10 weight% of desensitizer.

3. Red phosphorus as claimed in claim 1, the desensitized red phosphorus having a particle size between about 0.0001 and 0.1 mm.

* * * * *